Dec. 26, 1933.  D. J. MORAN ET AL  1,941,443
GATE VALVE ASSEMBLY
Filed May 18, 1933
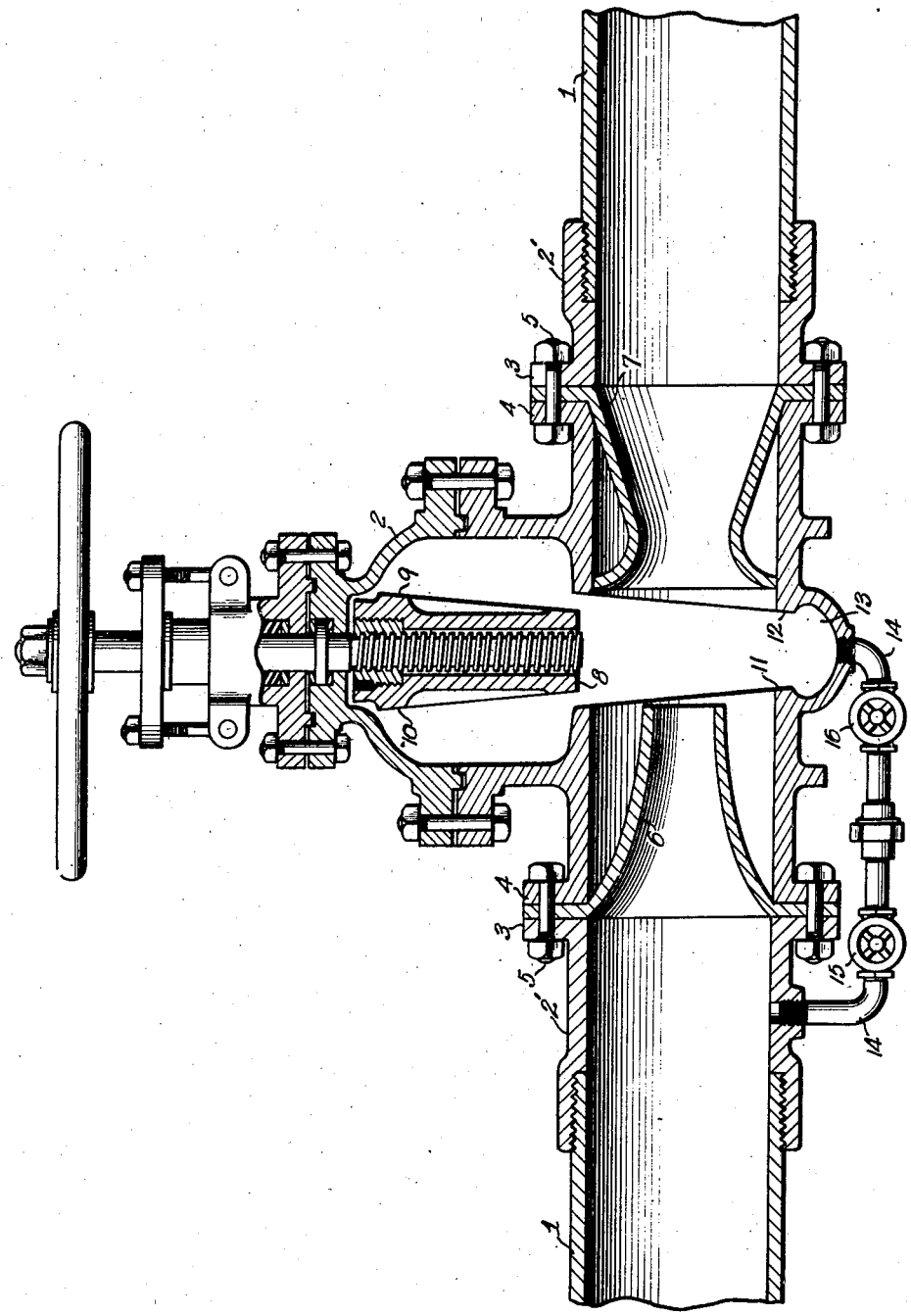
INVENTORS
Daniel J. Moran
and Edwin O. Bennett
BY Thos. E. Acfield
ATTORNEY Patented Dec. 26, 1933

1,941,443

UNITED STATES PATENT OFFICE 1,941,443

GATE VALVE ASSEMBLY

Daniel J. Moran, New York, N. Y., and Edwin O. Bennett, Ponca City, Okla.

Application May 18, 1933. Serial No. 671,627

2 Claims. (Cl. 251—59)

Our invention relates to gate valve assemblies and more particularly to a valve assembly for use in a pipeline adapted for the inter-state transportation of fluids.

In large pipelines, valves are fitted at suitable intervals so that a portion of the line may be isolated for repairs and replacements or the like. Valves are frequently used in the vicinity of booster stations which are frequently fitted on a bypass. Pipelines are apt to collect scaly sediment and the like throughout their tremendous length. When gate valves are used in horizontal position, the sediment, scale, and foreign matter or the like tends to collect in the sump which is customarily provided in gate valves to permit of the seating of the valve. The sediment and the like collecting in the sump or chamber prevents the valve from closing tightly.

One object of our invention is to provide a valve which will obviate the collection of sediment in the sump of the gate valve.

Another object of our invention is to provide a valve construction in which the sediment is prevented from collecting in the sump.

A further object of our invention is to provide a valve which is capable of being closed tightly at all times.

Other objects of our invention will appear from the following description.

The accompanying drawing which forms part of the instant specification and is to be read in connection therewith shows a gate valve in a pipeline, fitted with one form of structure embodying our invention.

In general our invention contemplates an arrangement whereby a constant stream of the fluid being pumped is passed through the sump of a gate valve to prevent the sediment from collecting. While any suitable means may be employed to accomplish this result, we are enabled to do so in an expeditious manner by converting a portion of the pressure energy into velocity energy and thus create an area of reduced pressure in the interseat space so that the difference of pressure will cause a portion of the fluid being pumped to enter the sump and wash out the sediment.

More particularly referring now to the drawing, interposed in a pipeline 1 is a gate valve 2 of standard type. The pipeline 1 is split and terminates in fittings 2' provided with flanges 3. The gate valve 2 is provided with flanges 4, adapted to be bolted together by means of bolts 5. Between the flanges 3 and 4 we provide a pair of nozzles 6 and 7, it being understood of course that the direction of flow of the fluid is from nozzle 6 to nozzle 7. The valve member 8 is provided with seating surfaces 9 and 10, adapted to seat upon seats 11 and 12. A sump 13 extends around the valve to permit the bottom portion thereof to project past the seats 11 and 12 at the lower portions thereof. It will be readily understood that, as the fluid flows through nozzle 6, a portion of the pressure energy will be converted into velocity energy, with the resultant drop in pressure. Nozzle 7, being a diverging nozzle, will reconvert a portion of the velocity energy into pressure energy so that there will be substantially the same pressure on both sides of the valve, neglecting friction and the loss of pressure entailed by the operation of our device as will be hereinafter more fully understood. It will be apparent that the pressure existing in the inter-valve space, that is, just after the fluid being pumped has emerged from nozzle 6, will be less than that existing in the pipeline at either side of the valve. Accordingly we provide a pipe connection 14 which is provided with valves 15 and 16, leading from one side of the nozzle 6 to the intervalve space at the lowest point thereof. It will be apparent that, due to the difference of pressure, a portion of the fluid being pumped will be shunted through pipe 14 and flow into sump 13, due to the pressure differential existing. This will provide a constant stream of the fluid being pumped for flushing out the sump 13 and preventing the deposition of sediment, scale, and the like.

It is believed that the operation of our device will be apparent from the above description.

It will be understood that certain features and sub-combinations are of utility and may be employed without reference to other features and sub-combinations. This is contemplated by and is within the scope of our claims. It is further obvious that various changes may be made in details within the scope of our claims without departing from the spirit of our invention. It is, therefore, to be understood that our invention is not to be limited to the specific details shown and described.

Having thus described our invention, what we claim is:

1. A pipeline valve assembly, comprising in combination a gate valve having inlet and outlet ports, a vena contracta in said inlet port, and a duct leading from the inlet side of said vena contracta to the valve sump.

2. A pipeline valve assembly comprising in combination a gate valve, said valve having inlet and outlet ports, a converging nozzle in said inlet port and a diverging nozzle in said outlet port and a duct for leading fluid from the inlet side of the converging nozzle to the valve sump.

DANIEL J. MORAN.
EDWIN O. BENNETT.